United States Patent
Ju

(10) Patent No.: US 7,593,621 B2
(45) Date of Patent: Sep. 22, 2009

(54) METHOD OF RESERVING SPACE ON A STORAGE MEDIUM FOR RECORDING AUDIO AND VIDEO CONTENT AND RECOFDING DEVICE THEREOF

(75) Inventor: Chi-Cheng Ju, Hsin-Chu (TW)

(73) Assignee: Mediatek Incorporation, Hsin-Chu Hsien (TW)

( * ) Notice: Subject to any disclaimer, the term of this patent is extended or adjusted under 35 U.S.C. 154(b) by 714 days.

(21) Appl. No.: 10/906,775

(22) Filed: Mar. 7, 2005

(65) Prior Publication Data
US 2006/0198607 A1 Sep. 7, 2006

(51) Int. Cl.
*H04N 5/78* (2006.01)
(52) U.S. Cl. .......................... 386/83; 725/38
(58) Field of Classification Search ............ 386/46, 386/83, 112; 725/39, 38
See application file for complete search history.

(56) References Cited

U.S. PATENT DOCUMENTS

| 5,291,301 | A | 3/1994 | Lee |
| 6,208,799 | B1* | 3/2001 | Marsh et al. ................ 386/83 |
| 7,003,213 | B1* | 2/2006 | Hasegawa ................... 386/83 |
| 7,088,910 | B2* | 8/2006 | Potrebic et al. ............. 386/83 |
| 7,369,750 | B2* | 5/2008 | Cheng et al. ................ 386/83 |
| 2002/0110353 | A1 | 8/2002 | Potrebic |
| 2003/0198458 | A1* | 10/2003 | Greenwood .................. 386/46 |
| 2005/0008336 | A1* | 1/2005 | Ishida .......................... 386/95 |
| 2005/0251830 | A1* | 11/2005 | Peeten et al. ................ 725/58 |

FOREIGN PATENT DOCUMENTS

| CN | 1346571 A | 4/2002 |
| JP | 2006-5541 | 1/2006 |
| WO | WO0059223 A1 | 10/2000 |

\* cited by examiner

*Primary Examiner*—David E Harvey
(74) *Attorney, Agent, or Firm*—Winston Hsu

(57) ABSTRACT

A method of recording audio and video content on a storage medium includes performing recording operations to record audio and video content on the storage medium; classifying the recording operations into a plurality of priority levels; and reserving space on the storage medium for recording operations being classified at a first priority level.

26 Claims, 10 Drawing Sheets

Reserved Table

| Program index | Start location | Resource size |
|---|---|---|
| A | Address A | Size_A |
| Z | Address Z | Size_Z |

Fig. 3

Timer Recording Table

| Program index | Priority | Begin time | End time | Record mode | Channel |
|---|---|---|---|---|---|
| A | Important | TimeB_A | TimeE_A | XP | 3 |
| B | Normal | TimeB_B | TimeE_B | SP | 23 |
| ⋯ | | | | | |
| Z | Important | TimeB_Z | TimeE_Z | EP | 4 |

METHOD OF RESERVING SPACE ON A STORAGE MEDIUM FOR RECORDING AUDIO AND VIDEO CONTENT AND RECOFDING DEVICE THEREOF

BACKGROUND OF INVENTION

The invention relates to audio and video recording devices, and more particularly, to audio and video recording devices supporting timer based recording operations for automatically recording audio and video content.

FIG. 1 shows a block diagram of a typical recording device 100 being coupled to a content signal source 102 such as a television receiver. For example, the recording device 100 could be a digital versatile disc (DVD) recorder and the storage medium 104 could be an optical disc. In another example, the recording device 100 could be a personal computer and the storage medium 104 could be a magnetic medium such as a hard disc drive. The recording device 100 receives an input signal $S_{IN}$ from the content signal source 102, encodes the input signal $S_{IN}$ to thereby form an encoded signal $S_{ENC}$, and stores data corresponding to the resulting encoded signal $S_{ENC}$ onto an attached storage medium 104. In this way, the audio and video content can be later reproduced (played) according to user requirements.

As an added feature, the recording device 100 will often include a timer 106 to allow the recording device 100 to record audio and video content that will occur at a future time onto the storage medium 104. To accomplish this function, a target date and time and a program duration are first configured in the timer 106. For example, a user of the recording device 100 will first configure the timer 106 to start the encoder 108 to record audio and video content received in the input signal $S_{IN}$ at a particular start date and time for the predetermined program duration. The predetermined program duration refers to the length of time that the user wants to record audio and video content onto the storage medium 104. Additionally, the user may specify a particular encoding rate (if different encoding rates are supported by the encoder 108) to control the quality of the encoded signal $S_{ENC}$, and a particular channel (if the content signal source provides different channels of content) in order to select specific audio and video content. In this way, the user of the recording device 100 can conveniently setup the recording device to automatically record audio and video content at a time when the user is not available to manually start the encoder 108.

However, after configuring the timer 106 to record future audio and video content, a user of the recording device 100 will often still want to use the recording device 100. Therefore, some problematic situations could occur. For example, if the user configures the timer 106 to record a first predetermined duration of audio and video content and then continues to manually record additional content onto the storage medium 104, the available space of the storage medium 104 may be insufficient to record the predetermined duration of audio and video content according to the timer based recording operation. In this situation, the timer based recording operation may fail or will record only a portion of the desired audio and video content. Additionally, in another problematic situation, the user of the recording device 100 may forget that a timer based recording operation is programmed into the timer 106 and will start a manual recording operation for a first channel just before the timer based recording operation for a second channel is to begin. In this situation, the timer based recording operation will fail because the recording device 100 contains only one encoder 108 and is therefore only capable of recording audio and video content from one channel at a time.

SUMMARY OF INVENTION

One objective of the claimed invention is therefore to provide a method of classifying recording operations of a recording device into a plurality of priority levels, to solve the above-mentioned problems.

According to an exemplary embodiment of the claimed invention, a method of recording audio and video content on a storage medium is disclosed. The method comprises performing recording operations to record audio and video content on the storage medium; classifying the recording operations into a plurality of priority levels; and reserving space on the storage medium for recording operations being classified at a first priority level.

According to another exemplary embodiment of the claimed invention, a recording device for storing audio and video content is disclosed. The recording device comprises a storage medium; a reserved table for marking a reserved status of space on the storage medium; and a storage manager being coupled to the storage medium and the reserved table for classifying recording operations of the recording device into a plurality of priority levels; and marking space within the reserved table to thereby reserve space on the storage medium for recording operations being classified at a first priority level.

According to another exemplary embodiment of the claimed invention, a method of recording audio and video content on a storage medium is disclosed. The method comprises setting up timer based recording operations for recording audio and video content occurring at a future time; classifying the timer based recording operations into a plurality of priority levels; calculating a space required by each timer based recording operation according to a recording quality mode and a recording duration of each timer based recording operation; and reserving at least the calculated space on the storage medium for each timer based recording operation being classified at a first priority level.

These and other objectives of the present invention will no doubt become obvious to those of ordinary skill in the art after reading the following detailed description of the preferred embodiment that is illustrated in the various figures and drawings.

BRIEF DESCRIPTION OF DRAWINGS

FIG. 3 is a table corresponding to the reserved space marked within the reserved table of FIG. 2.

FIG. 5 is a table showing a plurality of timer based recording operations listed on the timer list of FIG. 2.

DETAILED DESCRIPTION

Figure 1:
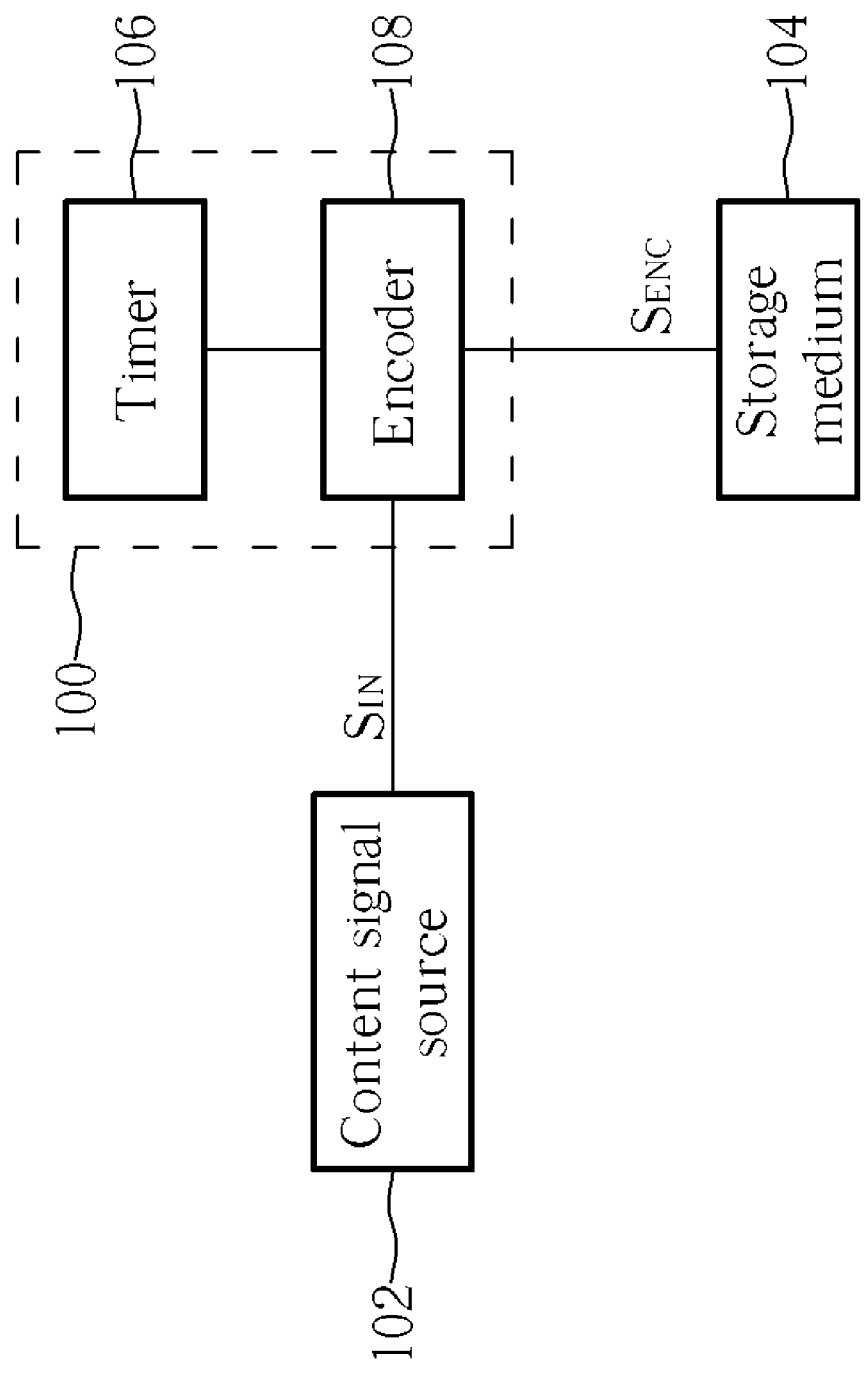
FIG. 1 is a block diagram of a typical recording device being coupled to a content signal source such as a television receiver.
Figure 2:
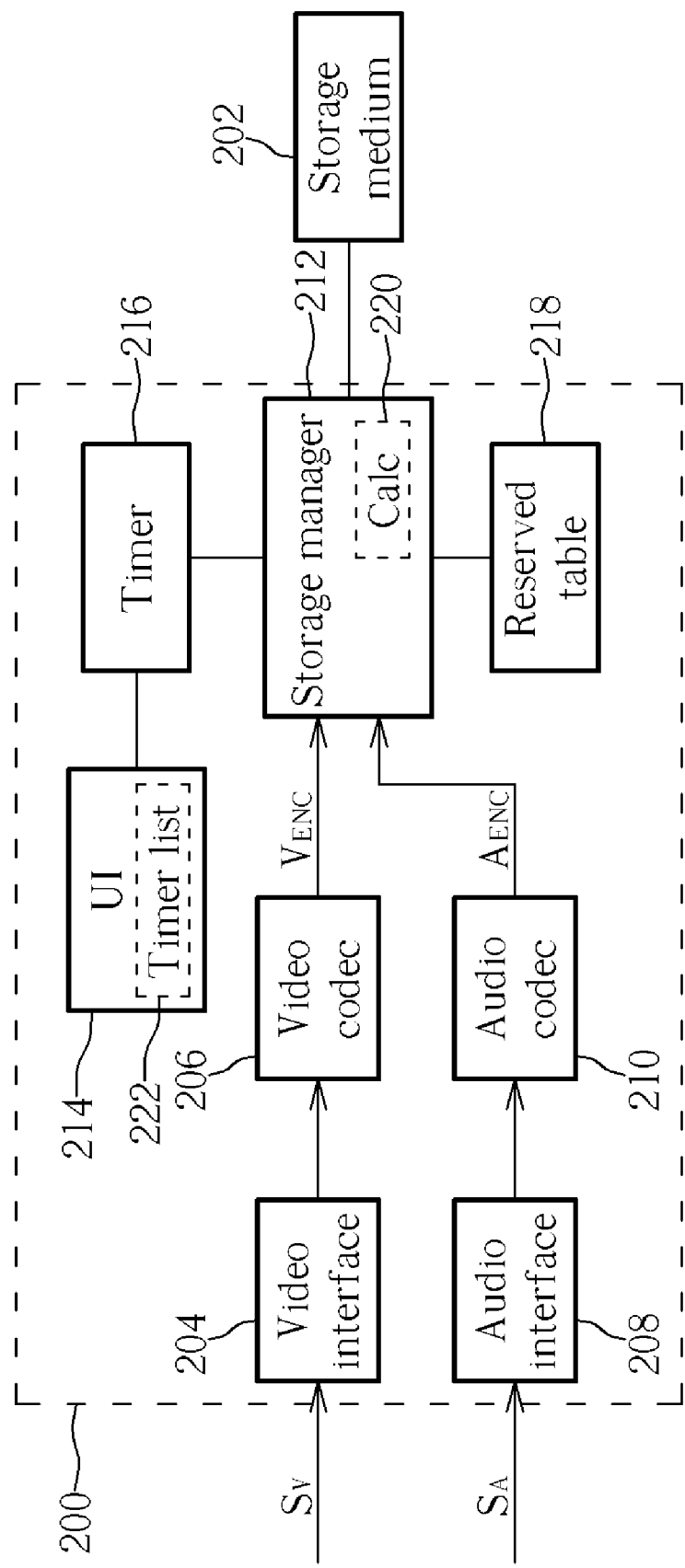
FIG. 2 is a block diagram of a recording device being coupled to a storage medium according to an exemplary embodiment of the present invention.

FIG. 2 shows a block diagram of a recording device 200 being coupled to a storage medium 202 according to an exemplary embodiment of the present invention. In this embodiment the recording device 200 includes a video interface 204, a video coder/decoder (codec) 206, an audio interface 208, an audio codec 210, a storage manager 212, a User Interface (UI) device 214, a timer 216, and a reserved table 218. The reserved table 218 is utilized by the storage manager 212 for marking a reserved status of space on the storage medium 202. For example, the storage medium 202 could be an optical disc, a magnetic storage medium, or another kind of storage medium. Additionally, in this embodiment, the UI device 214 includes a timer list 222, and the storage manager 212 includes a calculation device 220.

As shown in FIG. 2, the recording device 200 receives an input audio signal $S_A$ in addition to an input video signal $S_V$. The input audio signal $S_A$ is received by the audio interface 208 and is converted to an internal signal format. For example, voltage levels and other signal characteristics of the input audio signal $S_A$ could be converted, or an analog input audio signal $S_A$ could be sampled and converted to a digital format. After conversion by the audio interface 208, the audio codec 210 encodes the input audio signal $S_A$ to an encoded form, shown in FIG. 2 as the encoded audio signal $A_{ENC}$. Similarly, the input video signal $S_V$ is received by the video interface 204 and is converted to an internal signal format. For example, voltage levels and other signal characteristics of the input video signal $S_V$ could be converted or an analog input video signal $S_V$ could be sampled and converted to a digital format. After conversion by the video interface 204, the video codec 206 encodes the input video signal $S_V$ to an encoded form, shown in FIG. 2 as the encoded video signal $V_{ENC}$. It should be noted that the encoded video signal $V_{ENC}$ and the encoded audio signal $A_{ENC}$ correspond to the audio and video content for recording onto the storage medium 202 by the recording device 200. Additionally, as will be apparent to a person of ordinary skill in the art, although the input audio signal $S_A$ and input video signal $S_V$ of FIG. 2 are shown as separate signals, other embodiments of the recording device 200 are also possible wherein the audio and video content is received combined in a single signal.

In order to manage the recording operations of the recording device 200, the storage manager 212 is coupled to the storage medium 202, the reserved table 218, and the timer 216. During recording operations of recording encoded audio and video content $A_{ENC}$, $V_{ENC}$ onto the storage medium 202, the storage manager 212 classifies the recording operations into a plurality of priority levels and marks space within the reserved table 218 to thereby reserve space on the storage medium 202 for recording operations being classified at a first priority level. For example, the recording device 200 could support two different priority levels: a first priority level having a higher priority and a second priority level having a lower priority. In this embodiment, recording operations that are classified at the higher priority level are guaranteed to succeed because space on the storage medium 202 is already marked as reserved in the reserved table 218.

The storage manager 212 includes the calculation device 220 to calculate the space on the storage medium 202 required by a particular recording operation being classified at the first priority level. The calculation device calculates the space required by a particular recording operation according to a recording quality mode such as encoding rates of the video codec 206 and the audio codec 210 in addition to a recording duration of the particular recording operation. Usually, recording operation is carried out utilizing several recording modes, for example, including: High Picture Quality Play (XP), Standard Play (SP), Long Play (LP), and Extra Long Play (EP). The different recording modes correspond to different encoding bit rates. From highest bit rate to lowest bit rate, the order of different recording modes is: XP, SP, LP and then EP. Therefore, the XP mode has the highest encoding bit rate and the EP mode has the lowest encoding bit rate. For example, if the particular recording operation being classified at the first priority level (the high priority level) is configured to use a standard play (SP) encoding rate and has a program duration of 60 minutes, the calculation device 220 calculates the resulting space that will be required on the storage medium 202 according to the formula Resource size=(encoding rate*program duration) and marks at least this resulting amount of required space as reserved within the reserved table 218. In this way, regardless of when the particular recording operation being classified at the first priority level actually takes place, the required space is guaranteed to be available within the storage medium 202.

Figure 4:
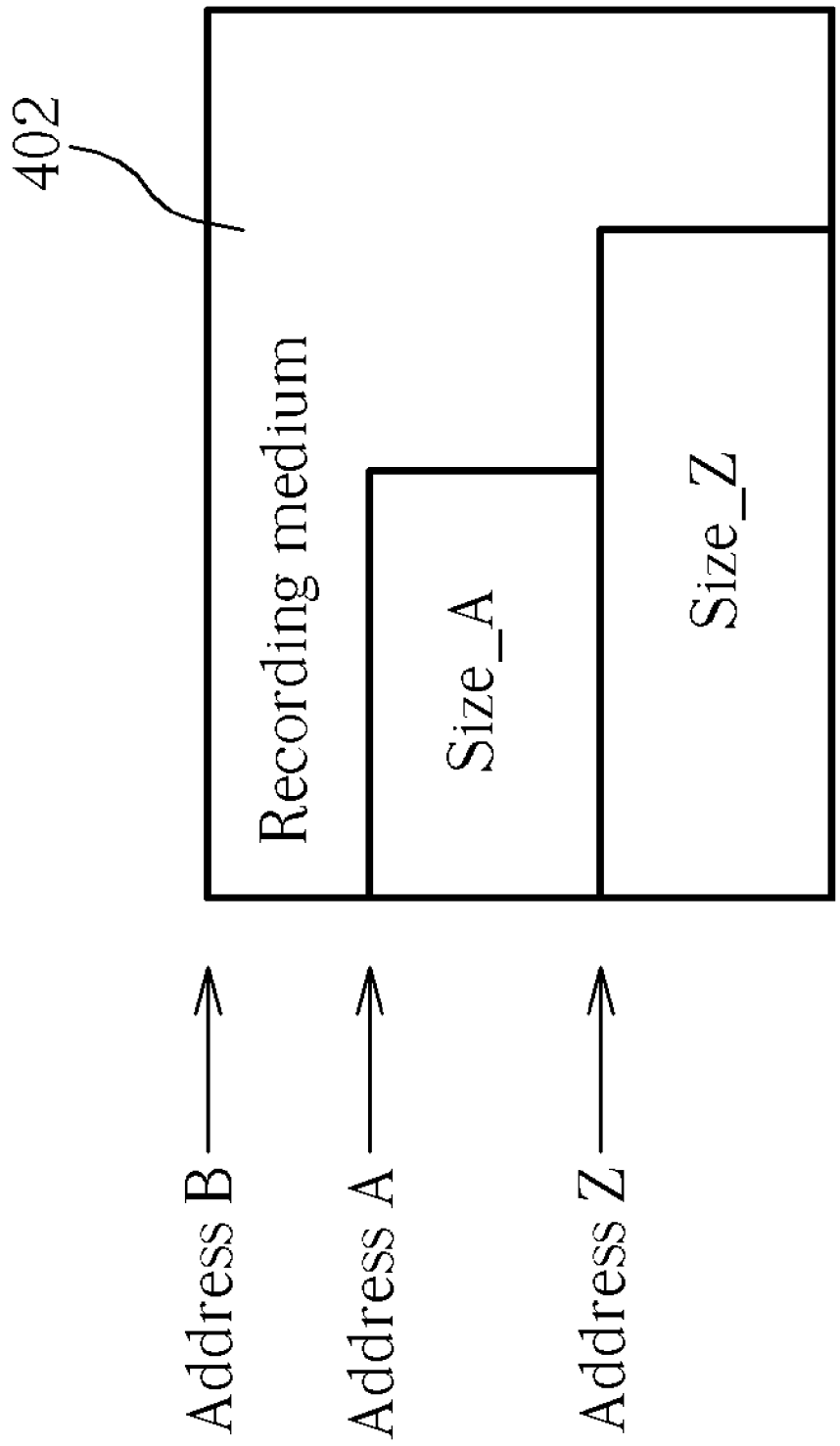
FIG. 4 is a diagram of the resulting reserved space on the storage medium of FIG. 2.

FIG. 3 and FIG. 4 show diagrams corresponding to the reserved space marked within the reserved table 218 and the resulting reserved space on the storage medium 202 according to this embodiment. When storing data within the storage medium 202 during a recording operation being classified at the first priority level, the storage manager 212 stores the audio and video data within the reserved space on the storage medium 202 corresponding to the marked space within the reserved table for the particular recording operation. As shown in FIG. 3, for example, a first reserved space (of size_A) is reserved for a first program (index A) being classified at the first priority level. Additionally, a second reserved space (of size_Z) is reserved for a second program (index Z) being classified at the first priority level. In FIG. 4, the remaining space 402 is unreserved space on the storage medium 202, which can be freely used for recording operations that are not classified at the first priority level. That is, the storage manager stores audio and video data of recording operations being classified at a second priority level (see the recording operations being classified as "Normal" in FIG. 5) within the remaining space 402 on the storage medium 202 not being marked as reserved in the reserved table 218.

As mentioned previously, the recording device 200 includes the timer 216 being coupled to a UI device 214. Within the UI device 214, the timer list 222 lists information corresponding to audio and video content occurring at future times that are to be recorded on the storage medium 202 by the recording device 200. The UI device 214 accepts user requests through such means as an onscreen display or remote control, and adds details for timer based recording operations to the timer list 222. For example, in this embodiment, when configuring a particular timer based recording operation, the user is prompted for the priority level of the particular timer based recording operation in addition to the start time, end time, record mode (encoding/quality rate), and channel (if supported by the content signal source 102). This information is stored in the timer list 222. It should also be noted that the UI device 214 can additionally be used to ask the user to enter a priority level and record mode for manually started recording operations. That is, the storage manager 212 classifies all recording operations according to priority levels specified by a user through the UI device 214 when starting a new (manually started) recording operation or setting up a timer based recording operation. In this way, conflicts between timer based recording operations and manually started recording operations can be resolved by the storage manager 212.

FIG. 5 shows a table showing a plurality of timer based recording operations listed on the timer list 222 of FIG. 2. To ensure that all timer based recording operations described in the timer list 222 as being classified at the first priority level (labeled in FIG. 5 as "Important") are guaranteed to succeed, the storage manager marks space within the reserved table 218 to thereby reserve space on the storage medium 202 for each of the timer based recording operations on the timer list 222 being classified at the first priority listed in the timer list 222. For example, a program index field identifies each timer based recording operation, a priority level field identifies the priority level, begin time and end time fields identify the program duration for when the audio and video content is to be recorded, a record mode field identifies the encoding rate for the video codec 206 and the audio codec 210, and a channel field identifies a particular channel of video and audio content. The channel field need only be used if the content signal source 102 provides multiple channels of audio and video content.

In this embodiment, the UI device 214 ensures that timer based recording operations listed on the timer list 222 do not overlap with each other as the recording device 200 is only capable of utilizing the audio codec 210 and the video codec 206 to encode one set of audio and video content at a time. As shown in FIG. 3, the storage manager 212 reserves space on the storage medium 202 by marking space within the reserved table for the recording operations classified at the first priority levels. For example, in FIG. 5, both the first program index A and the last program index Z are classified at the first priority level (shown in FIG. 5 as priority being equal to "Important") and therefore have space marked as reserved in the reserved table 218 shown in FIG. 3.

Figure 6:
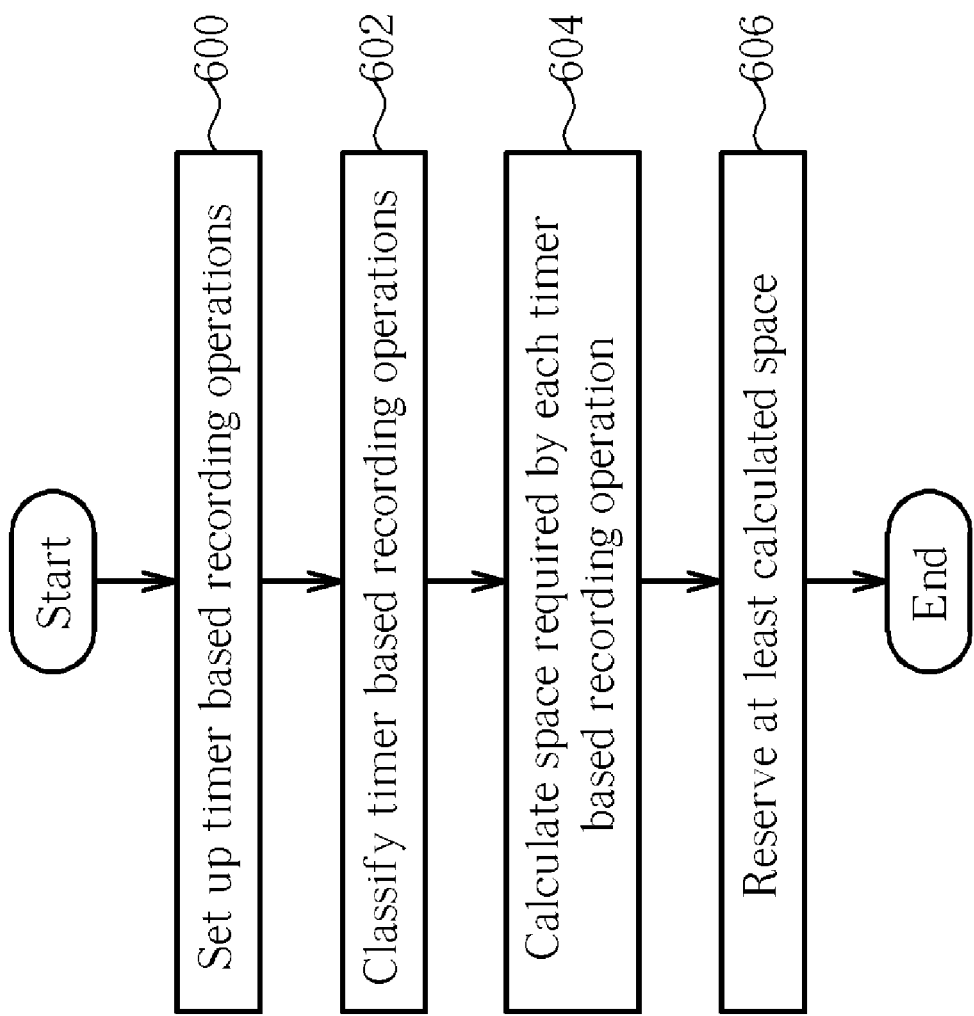
FIG. 6 is a flowchart describing a method of recording audio and video content on a storage medium according to operations performed by the recording device shown in FIG. 2.

FIG. 6 shows a flowchart describing a method of recording audio and video content on a storage medium 202 according to the operations performed by the recording device 200 shown in FIG. 2 in this exemplary embodiment of the present invention. Provided that substantially the same result is achieved, the steps of the flowchart shown in FIG. 6 need not be in the exact order shown and need not be contiguous, that is, other steps can be intermediate. In this embodiment, the method of recording audio and video content on the storage medium 202 includes the following steps:

Step 600: Set up timer based recording operations for recording audio and video content occurring at a future time. For example, utilize the UI device 214 to store timer based recording operations on the timer list 222.

Step 602: Classify the timer based recording operations into a plurality of priority levels. For example, utilize the UI device 214 to query a user of the recording device 200 for the desired priority level of each of the timer based recording operations that are stored on the timer list 222 in addition to the priority level of each manually started recording operation.

Step 604: Calculate the space required by each timer based recording operation according to a recording quality mode and a recording duration of each timer based recording operation. For example, as described above, the calculation device 220 calculates the space required by a particular recording operation according to a recording quality mode such as encoding rates of the video codec 206 and the audio codec 210 in addition to a recording duration of the particular recording operation.

Step 606: Reserve at least the calculated space on the storage medium 202 for each timer based recording operation being classified at a first priority level to thereby ensure that all timer based recording operations at the first priority level will have sufficient space to fully complete regardless of any manually started recording operations that may occur before the timer based recording operation takes place.

Figure 7:
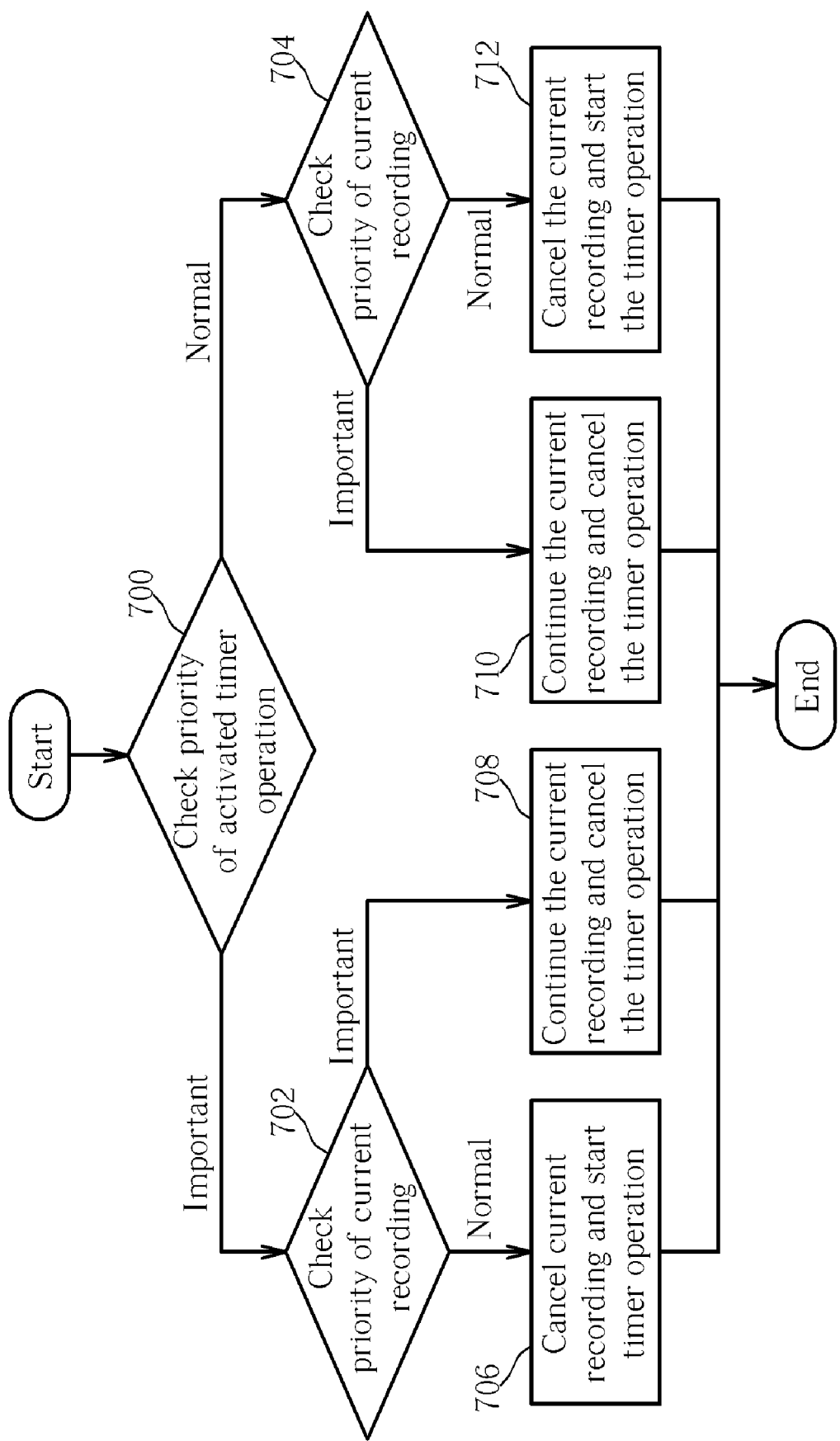
FIG. 7 is a flowchart describing how to decide whether to cancel or continue a timer based recording operation if a manually started recording operation is already taking place according to an exemplary embodiment of the present invention.

FIG. 7 shows a flowchart describing how to decide whether to cancel or continue a timer based recording operation if a manually started recording operation is already taking place according to one exemplary embodiment. In situations where there is only one (or an insufficient number of) codecs 206, 210, conflicts of recording operations could occur and the recording device 200 may be required to select which recording operation is finished/cancelled. Because the user may forget about timer based recording operations that are stored on the timer list 216, the storage manager 212 checks if it a current recording operation is already being performed when starting a timer based recording operation (steps 702 and 704). That is, when the timer 216 reaches the start time of a timer based recording operation listed in the timer list 222, the storage manager will selectively either cancel or start the timer based recording operation according to the respective priority levels of the timer based recording operation and the current recording operation.

For example, in this embodiment, the storage manager 212 cancels the timer based recording operation if the current recording operation is classified at the first priority level and is already being performed at the start time of the timer based recording operation (step 710). In this way, manually started recording operations that are classified at the first priority level (the "Important" classification shown in FIG. 5 and FIG. 7) will not be aborted by a timer based recording operation at a lower priority level. Similarly, to ensure timer based recording operations that are classified at the first priority level are guaranteed to succeed, the storage manager 212 cancels the current recording operation if the timer based recording operation that is scheduled to start is classified at the first priority level (step 706). As shown in step 712, in this embodiment, if both the current recording operation and the timer based recording operation are classified at the second priority level (i.e., the "normal" classification shown in FIG. 5 and FIG. 7), the storage manager 212 cancels the current recording operation and starts the timer operation. Moreover, as shown in step 708, if both the current recording operation and the timer based recording operation are classified at the first priority level, the storage manager 212 continues the current recording operation and cancels the timer operation. However, it should be noted that the operation of steps 708 and 712 could be different in other embodiments. For example, a user setting could be used to specify which recording operation should be continued in each of these situations.

Additionally, in a more generalized embodiment, FIG. 7 could also be used to describe the decision of whether to cancel or continue a new recording operation if a current recording operation is already taking place by replacing the label "timer operation" in FIG. 7 with "new recording operation". In this more generalized embodiment, if a current recording operation is already being performed when starting a new recording operation, and the storage manager 212 cancels the new recording operation if the current recording operation is classified at the first priority level (step 710). In another situation, the storage manager 212 cancels the current recording operation if the new recording operation is classified at the first priority level (step 706).

Figure 8:
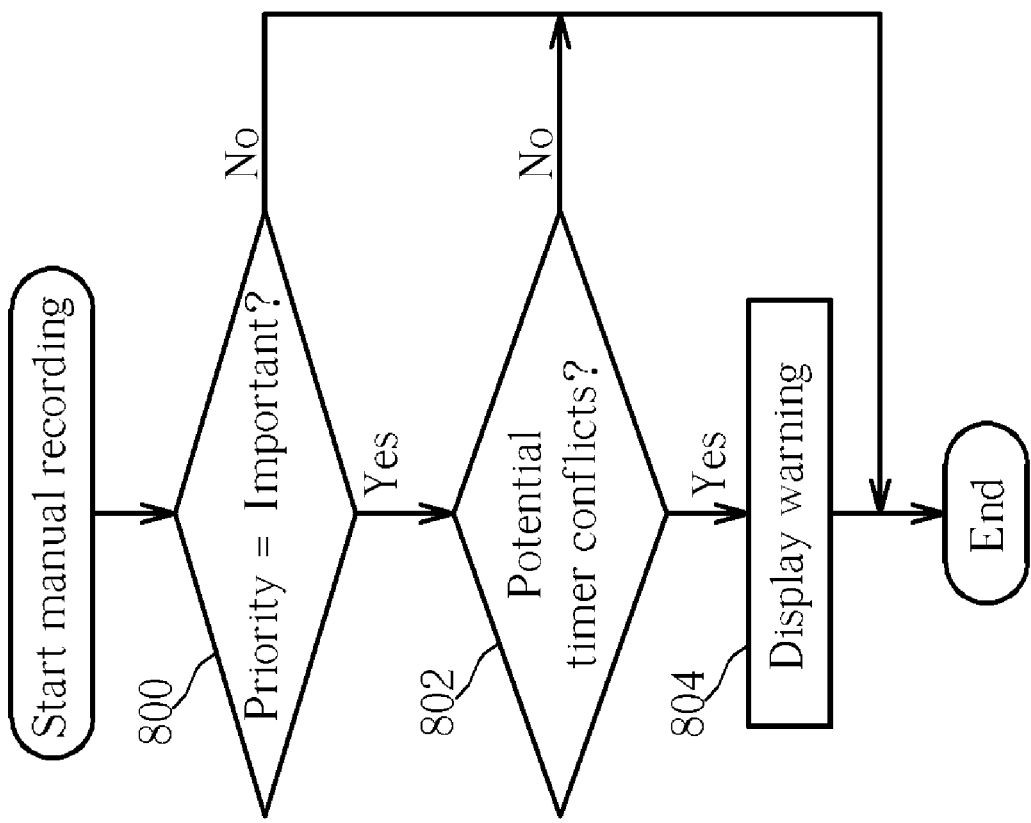
FIG. 8 is a flowchart describing the process of checking for conflicts when starting a manual recording operation according to an exemplary embodiment of the present invention.

FIG. 8 shows a flowchart describing the process of checking for conflicts when starting a manual recording operation. For example, the flowchart of FIG. 8 can be performed when the user of the recording device 200 presses a "record" button to manually begin recording audio and video content at a chosen priority level. Provided that substantially the same result is achieved, the steps of the flowchart shown in FIG. 8 need not be in the exact order shown and need not be contiguous, that is, other steps can be intermediate. In this embodiment, starting the manual recording operation includes the following steps:

Step 800: Check if the priority level chosen by the user when starting the manual recording operation is equal to the first priority level (shown in FIG. 8 as "Important"). If yes, proceed to step 802; otherwise, end.

Step 802: Check for potential timer conflicts between the manual recording operation and the timer based recording operations according to the remaining free space on the storage medium and the time until the next first priority timer based recording operation. If a potential conflict exists, proceed to step 804; otherwise, end.

Step 804: Display a warning to the user regarding the potential conflict.

As shown in FIG. 8, in the situation that a manual recording operation with a high priority is started by a user within a conflicting time range of a timer based recording operation also being classified at a high priority, the storage manager 212 controls the UI device 214 to display a warning message to the user. The warning message is to ensure the user is aware that there is a potential conflict between two recording operations both being classified at the first priority level. The recording time duration of the manually started recording operation is set by user when the manually recording operation started by a user. In this embodiment, if the manually started recording time is greater than the time difference between the start of the manually started recording operation and the scheduled beginning of the timer based recording operation, then the storage manager 212 controls the UI device 214 to warn the user (step 804). It should also be noted that, in another embodiment, FIG. 8 can be generalized by removing step 800. That is, conflict checks between manually started recording operations and timer based recording operations could be performed regardless of priority levels.

Figure 9:
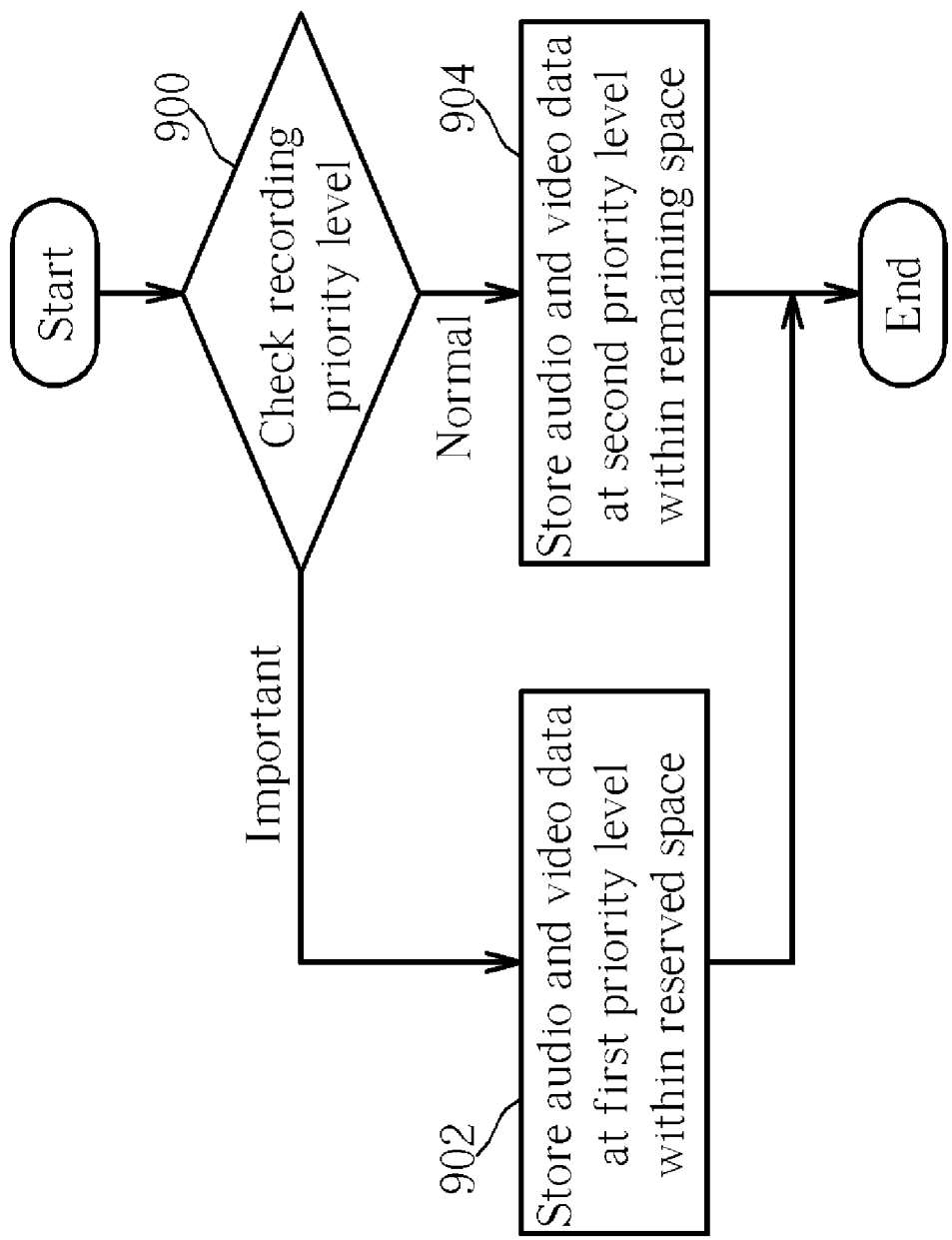
FIG. 9 is a flowchart describing the operations of actually recording the audio and video data of a recording operation as performed by the storage manager of FIG. 2.

FIG. 9 shows a flowchart describing the operations of actually recording the audio and video data of a recording operation as performed by the storage manager 212 of FIG. 2. Provided that substantially the same result is achieved, the steps of the flowchart shown in FIG. 9 need not be in the exact order shown and need not be contiguous, that is, other steps can be intermediate. In this embodiment, recording the audio and video data of a recording operation includes the following steps:

Step 900: Check the recording priority level. If the recording priority level is at the first priority level (shown in FIG. 9 as the "Important" priority level), proceed to step 902. Otherwise, proceed to step 904.

Step 902: Store the audio and video data of a particular recording operation being classified at the first priority level (shown in FIG. 9 as the "Important" priority level) within the reserved space on the storage medium 202 corresponding to the particular recording operation. That is, the audio and video data of the program having the index A in the reserved table 218 of FIG. 5 is stored within the reserved area starting at address A and having a size of Size_A on the storage medium 202, as shown in FIG. 4.

Step 904: Store audio and video data of recording operations being classified at a second priority level (shown in FIG. 9 as the "Normal" priority level) within remaining space 402 on the storage medium 202 not being reserved.

Figure 10:
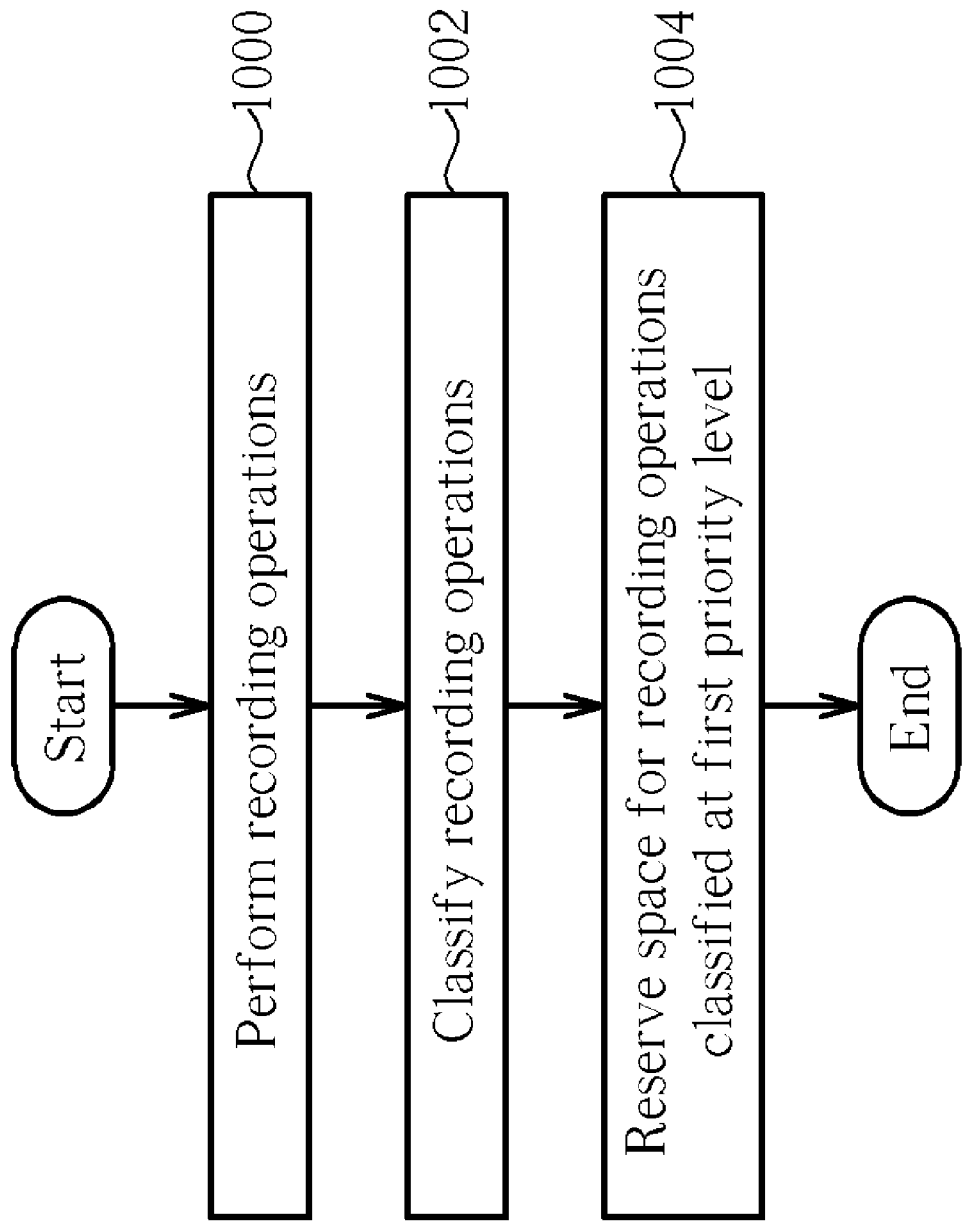
FIG. 10 is a generalized flowchart describing operations of recording audio and video content on a storage medium according to another exemplary embodiment of the present invention.

It should be noted that although the embodiment of the present invention described above in regards to the recording device shown in FIG. 2 includes the timer based recording operations, the priority level teachings of the present invention can also be implemented in a recording device not having a timer. Additionally, more than two priority levels can also be utilized according to the present invention. For example, FIG. 10 shows a generalized flowchart describing operations of recording audio and video content on a storage medium according to another exemplary embodiment of the present invention. Provided that substantially the same result is achieved, the steps of the flowchart shown in FIG. 10 need not be in the exact order shown and need not be contiguous, that is, other steps can be intermediate. In this embodiment, recording audio and video content on a storage medium includes the following steps:

Step 1000: Perform recording operations to record audio and video content on the storage medium.

Step 1002: Classify the recording operations into a plurality of priority levels.

Step 1004: Reserve space on the storage medium for recording operations being classified at a first priority level.

In this way, recording operations that are classified at the first priority level are guaranteed to succeed because sufficient space has already been reserved for the first priority recording operations on the storage medium. Utilizing priority levels to classify recording operations according to the present invention increases the reliability of both manual and automatic recording operations performed by a recording device. Additionally, priority levels allow the recording device to automatically perform conflict prevention and resolution between different recording operations that may overlap with each other.

The present invention provides a recording device and method of recording audio and video content on a storage medium. By performing recording operations to record audio and video content on the storage medium, classifying the recording operations into a plurality of priority levels, and reserving space on the storage medium for recording operations being classified at a first priority level, the recording device and method of the present invention allow users to perform both manual and automatic recording operations with increased reliability.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of recording audio and video content on a storage medium, the method comprising:

performing recording operations to record audio and video content on the storage medium;

utilizing a storage manager coupled to the storage medium to classify the recording operations into a plurality of priority levels;

utilizing a reserved table coupled to the storage manager to reserve space on the storage medium for recording operations being classified at a first priority level;
utilizing the storage manager to check if a current recording operation is already being performed when starting a new recording operation;
utilizing the storage manager to cancel the new recording operation when a current recording operation being classified at the first priority level is already being performed when starting the new recording operation;
setting up timer based recording operations for recording audio and video content occurring at a future time on the storage medium;
reserving space on the storage medium for timer based recording operations being classified at the first priority level;
checking if a current recording operation is already being performed when starting a timer based recording operation; and
canceling the timer based recording operation when a current recording operation being classified at the first priority level is already being performed when starting the timer based recording operation.

2. The method of claim 1, wherein reserving space on the storage medium for a particular recording operation being classified at the first priority level further comprises:
determining a recording quality mode of the particular recording operation;
determining a recording duration of the particular recording operation;
calculating the space required by the particular recording operation according to the recording quality mode and the recording duration; and
reserving at least the calculated space on the storage medium.

3. The method of claim 1, further comprising storing audio and video data of a particular recording operation being classified at the first priority level within the reserved space on the storage medium corresponding to the particular recording operation.

4. The method of claim 1, further comprising displaying a warning message to a user when a manual recording operation being classified at the first priority level is started by the user within a conflicting time range of a timer based recording operation also being classified at the first priority level.

5. The method of claim 4, further comprising calculating the conflicting time range according to an encoding rate of the manually started recording operation and a size of remaining space not being reserved on the storage medium.

6. The method of claim 1, further comprising storing audio and video data of a recording operation being classified at a second priority level within remaining space on the storage medium not being reserved.

7. The method of claim 1, wherein classifying the recording operations further comprises querying a user for the priority level of the new recording operation when staffing the new recording operation or setting up a new timer based recording operation.

8. The method of claim 1, wherein the recording medium is an optical storage disc.

9. The method of claim 1, wherein the recording medium is a magnetic storage medium.

10. A method of recording audio and video content on a storage medium, the method comprising:
performing recording operations to record audio and video content on the storage medium;
utilizing a storage manager coupled to the storage medium to classify the recording operations into a plurality of priority levels;
utilizing a reserved table coupled to the storage manager to reserve space on the storage medium for recording operations being classified at a first priority level;
utilizing the storage manager to check if a current recording operation is already being performed when starting a new recording operation;
utilizing the storage manager to cancel the new recording operation when a current recording operation being classified at the first priority level is already being performed when starting the new recording operation;
setting up timer based recording operations for recording audio and video content occurring at a future time on the storage medium;
reserving space on the storage medium for timer based recording operations being classified at the first priority level;
checking if a current recording operation is already being performed when starting a timer based recording operation;
canceling the timer based recording operation when a current recording operation being classified at the first priority level is already being performed when starting the timer based recording operation; and
canceling the current recording operation if the timer based recording operation is classified at the first priority level.

11. A method of recording audio and video content on a storage medium, the method comprising:
performing recording operations to record audio and video content on the storage medium;
utilizing a storage manager coupled to the storage medium to classify the recording operations into a plurality of priority levels;
utilizing a reserved table coupled to the storage manager to reserve space on the storage medium for recording operations being classified at a first priority level;
utilizing the storage manager to check if a current recording operation is already being performed when staffing a new recording operation;
utilizing the storage manager to cancel the new recording operation when a current recording operation being classified at the first priority level is already being performed when starting the new recording operation; and
canceling the current recording operation when the new recording operation is classified at the first priority level.

12. A recording device for storing audio and video content, the recording device comprising:
a storage medium;
a reserved table for marking a reserved status of space on the storage medium; and
a storage manager being coupled to the storage medium and the reserved table for classifying recording operations of the recording device into a plurality of priority levels; and marking space within the reserved table to thereby reserve space on the storage medium for recording operations being classified at a first priority level;
wherein the storage manager is further for checking if a current recording operation is already being performed when staffing a new recording operation, and canceling the new recording operation when a current recording operation being classified at the first priority level is already being performed when starting the new recording operation.

13. The recording device of claim 12, wherein the storage manager further comprises a calculation device for calculating the space required by a particular recording operation according to a recording quality mode of the particular recording operation and a recording duration of the particular recording operation; and the storage manager is further for reserving the space on the storage medium for recording operations being classified at the first priority level by marking at least the calculated space on the storage medium as being reserved within the reserved table.

14. The recording device of claim 12, wherein the storage manager is further for storing audio and video data of a particular recording operation being classified at the first priority level within the reserved space on the storage medium corresponding to the marked space within the reserved table for the particular recording operation.

15. The recording device of claim 12, further comprising:
a timer;
a timer list comprising details corresponding to audio and video content occurring at a future time that are to be recorded on the storage medium by the recording device; and
a user interface being coupled to the timer and the storage manager for adding timer based recording operations to the timer list according to user requests;
wherein the storage manager is further for marking space within the reserved table to thereby reserve space on the storage medium for timer based recording operations on the timer list being classified at the first priority level.

16. The recording device of claim 15, wherein the storage manager is further for checking if a current recording operation is already being performed when starting a timer based recording operation, and canceling the timer based recording operation when a current recording operation being classified at the first priority level is already being performed when starting the timer based recording operation.

17. The recording device of claim 15, wherein the storage manager is further for canceling the current recording operation when the timer based recording operation is classified at the first priority level.

18. The recording device of claim 15, wherein the user interface is further for displaying a warning message when a manual recording operation being classified at the first priority level is started by a user within a conflicting time range of a timer based recording operation also being classified at the first priority level.

19. The recording device of claim 18, wherein the user interface calculates the conflicting time range according to an encoding rate of the manually started recording operation and a size of remaining space not being reserved on the storage medium.

20. The recording device of claim 12, wherein the storage manager is further for canceling the current recording operation when the new recording operation is classified at the first priority level.

21. The recording device of claim 12, wherein the storage manager is further for storing audio and video data of a recording operation being classified at a second priority level within remaining space on the storage medium not being marked as reserved in the reserved table.

22. The recording device of claim 12, further comprising a user interface being coupled to the storage manager; wherein the storage manager is further for classifying the recording operations according to priority levels specified by a user through the user interface when starting the new recording operation or setting up a timer based recording operation.

23. The recording device of claim 12, wherein the recording medium is an optical storage disc.

24. The recording device of claim 12, wherein the recording medium is a magnetic storage medium.

25. A recording device for storing audio and video content, the recording device comprising:
a storage medium;
a reserved table for marking a reserved status of space on the storage medium;
a storage manager being coupled to the storage medium and the reserved table for classifying recording operations of the recording device into a plurality of priority levels, and marking space within the reserved table to thereby reserve space on the storage medium for recording operations being classified at a first priority level;
a timer;
a timer list comprising details corresponding to audio and video content occurring at a future time that are to be recorded on the storage medium by the recording device; and
a user interface being coupled to the timer and the storage manager for adding timer based recording operations to the timer list according to user requests;
wherein the storage manager is further for marking space within the reserved table to thereby reserve space on the storage medium for timer based recording operations on the timer list being classified at the first priority level, checking if a current recording operation is already being performed when starting a timer based recording operation, and canceling the timer based recording operation when a current recording operation being classified at the first priority level is already being performed when starting the timer based recording operation.

26. The recording device of claim 25, wherein the storage manager is further for canceling the current recording operation if the timer based recording operation is classified at the first priority level.

* * * * *

UNITED STATES PATENT AND TRADEMARK OFFICE
CERTIFICATE OF CORRECTION

PATENT NO.         : 7,593,621 B2
APPLICATION NO.    : 10/906775
DATED              : September 22, 2009
INVENTOR(S)        : Chi-Cheng Ju Page 1 of 1

It is certified that error appears in the above-identified patent and that said Letters Patent is hereby corrected as shown below:

Title Page, item (54) and Col. 1, correct the title of invention from "METHOD OF RESERVING SPACE ON A STORAGE MEDIUM FOR RECORDING AUDIO AND VIDEO CONTENT AND RECOFDING DEVICE THEREOF" to "METHOD OF RESERVING SPACE ON A STORAGE MEDIUM FOR RECORDING AUDIO AND VIDEO CONTENT AND RECORDING DEVICE THEREOF"

Signed and Sealed this

Tenth Day of November, 2009

David J. Kappos
*Director of the United States Patent and Trademark Office*